United States Patent
Chavan et al.

(10) Patent No.: US 9,886,459 B2
(45) Date of Patent: Feb. 6, 2018

(54) METHODS AND SYSTEMS FOR FAST SET-MEMBERSHIP TESTS USING ONE OR MORE PROCESSORS THAT SUPPORT SINGLE INSTRUCTION MULTIPLE DATA INSTRUCTIONS

(71) Applicant: Oracle International Corporation, Redwood Shores, CA (US)

(72) Inventors: Shasank K. Chavan, Menlo Park, CA (US); Phumpong Watanaprakornkul, Bangkok (TH)

(73) Assignee: Oracle International Corporation, Redwood Shores, CA (US)

(*) Notice: Subject to any disclaimer, the term of this patent is extended or adjusted under 35 U.S.C. 154(b) by 650 days.

(21) Appl. No.: 14/338,219

(22) Filed: Jul. 22, 2014

(65) Prior Publication Data
US 2015/0088926 A1  Mar. 26, 2015

Related U.S. Application Data (60) Provisional application No. 61/880,852, filed on Sep. 21, 2013.

(51) Int. Cl.
*G06F 17/30* (2006.01)
*G06F 15/80* (2006.01)
(Continued)

(52) U.S. Cl.
CPC ........ *G06F 17/30315* (2013.01); *G06F 3/064* (2013.01); *G06F 3/0604* (2013.01);
(Continued)

(58) Field of Classification Search
CPC ......... G06F 17/30315; G06F 17/30312; G06F 7/764; G06F 9/30032; G06F 17/30477
(Continued)

(56) References Cited

U.S. PATENT DOCUMENTS

| | | | |
|---|---|---|---|
| 4,626,829 A | 12/1986 | Hauck | |
| 5,109,226 A | 4/1992 | MacLean | |

(Continued)

FOREIGN PATENT DOCUMENTS

| | | |
|---|---|---|
| EP | 1 111 500 A1 | 3/1996 |
| EP | 2040180 A1 | 3/2009 |

(Continued)

OTHER PUBLICATIONS

U.S. Appl. No. 14/337,142, filed Jul. 21, 2014, Notice of Allowance dated Apr. 27, 2016.
(Continued)

*Primary Examiner* — Vincent F Boccio
(74) *Attorney, Agent, or Firm* — Hickman Palermo Becker Bingham LLP

(57) ABSTRACT

Methods and apparatuses for determining set-membership using Single Instruction Multiple Data ("SIMD") architecture are presented herein. Specifically, methods and apparatuses are discussed for determining, in parallel, whether multiple values in a first set of values are members of a second set of values. Many of the methods and systems discussed herein are applied to determining whether one or more rows in a dictionary-encoded column of a database table satisfy one or more conditions based on the dictionary-encoded column. However, the methods and systems discussed herein may apply to many applications executed on a SIMD processor using set-membership tests.

18 Claims, 5 Drawing Sheets

(51) Int. Cl.
| | |
|---|---|
| *G06F 15/78* | (2006.01) |
| *G06F 12/1018* | (2016.01) |
| *G06F 3/06* | (2006.01) |
| *G06F 12/0815* | (2016.01) |

(52) U.S. Cl.
CPC .......... *G06F 3/065* (2013.01); *G06F 12/0815* (2013.01); *G06F 12/1018* (2013.01); *G06F 15/78* (2013.01); *G06F 15/8084* (2013.01); *G06F 17/30312* (2013.01); *G06F 17/30377* (2013.01); *G06F 17/30477* (2013.01); *G06F 17/30595* (2013.01); *G06F 2003/0697* (2013.01); *G06F 2212/1021* (2013.01); *G06F 2212/1032* (2013.01); *G06F 2212/2542* (2013.01); *G06F 2212/313* (2013.01)

(58) Field of Classification Search
USPC ............... 707/769; 708/209; 712/4; 345/505
See application file for complete search history.

(56) References Cited

U.S. PATENT DOCUMENTS

| | | | |
|---|---|---|---|
| 5,175,810 | A | 12/1992 | Young et al. |
| 5,287,193 | A | 2/1994 | Lin |
| 5,423,010 | A | 6/1995 | Mizukami |
| 5,511,190 | A | 4/1996 | Sharma et al. |
| 5,617,567 | A | 4/1997 | Doktor |
| 5,655,080 | A | 8/1997 | Dias et al. |
| 5,692,174 | A | 11/1997 | Bireley |
| 5,696,956 | A | 12/1997 | Guttag |
| 5,696,959 | A | 12/1997 | Guttag |
| 5,706,495 | A | 1/1998 | Chadha et al. |
| 5,778,430 | A | 7/1998 | Ish et al. |
| 5,826,529 | A | 10/1998 | Doktor |
| 5,884,229 | A | 3/1999 | Ramesh et al. |
| 5,884,299 | A | 3/1999 | Ramesh |
| 5,887,183 | A | 3/1999 | Agarwal |
| 5,933,650 | A * | 8/1999 | van Hook .................. G06F 5/00 712/2 |
| 5,987,407 | A | 11/1999 | Wu |
| 6,006,179 | A * | 12/1999 | Wu .......................... G10L 19/26 704/205 |
| 6,009,432 | A | 12/1999 | Tarin |
| 6,047,081 | A | 4/2000 | Groezinger et al. |
| 6,065,070 | A | 5/2000 | Johnson |
| 6,118,724 | A | 9/2000 | Higginbottom |
| 6,219,457 | B1 | 4/2001 | Potu |
| 6,317,824 | B1 | 11/2001 | Thakkar et al. |
| 6,331,826 | B1 | 12/2001 | Wagner |
| 6,336,180 | B1 | 1/2002 | Long |
| 6,381,601 | B1 | 4/2002 | Fujiwara et al. |
| 6,416,410 | B1 | 7/2002 | Abou-Samra |
| 6,671,797 | B1 | 12/2003 | Golston |
| 6,829,697 | B1 | 12/2004 | Davis et al. |
| 6,996,569 | B1 | 2/2006 | Bedell et al. |
| 7,149,769 | B2 | 12/2006 | Lubbers et al. |
| 7,769,726 | B2 | 8/2010 | Faerber et al. |
| 7,861,060 | B1 | 12/2010 | Nickollis et al. |
| 8,049,760 | B2 | 11/2011 | Jiao et al. |
| 8,126,855 | B2 | 2/2012 | Faerber et al. |
| 8,326,810 | B2 | 12/2012 | Faerber et al. |
| 8,433,684 | B2 | 4/2013 | Munoz |
| 8,667,252 | B2 | 3/2014 | Colavin et al. |
| 8,826,522 | B2 | 9/2014 | Roblot |
| 8,856,484 | B2 | 10/2014 | Ben-Tsion et al. |
| 9,355,146 | B2 | 5/2016 | Arndt |
| 9,432,298 | B1 | 8/2016 | Smith |
| 2001/0037345 | A1 | 11/2001 | Kiernan et al. |
| 2002/0032678 | A1 | 3/2002 | Cornwell et al. |
| 2002/0188830 | A1 | 12/2002 | Boles et al. |
| 2003/0167460 | A1 | 9/2003 | Desai |
| 2003/0187858 | A1 | 10/2003 | Kirk et al. |
| 2003/0229640 | A1 | 12/2003 | Carlson |
| 2004/0030863 | A1 | 2/2004 | Paver |
| 2004/0068642 | A1* | 4/2004 | Tanaka ................ G06F 9/30014 712/223 |
| 2004/0098372 | A1 | 5/2004 | Bayliss |
| 2004/0221192 | A1 | 11/2004 | Motta |
| 2005/0033818 | A1 | 2/2005 | Jardin |
| 2005/0055380 | A1 | 3/2005 | Thompson et al. |
| 2005/0091256 | A1 | 4/2005 | Rathakrishnan et al. |
| 2005/0131893 | A1 | 6/2005 | Von Glan |
| 2005/0165798 | A1 | 7/2005 | Cherkauer et al. |
| 2005/0177706 | A1 | 8/2005 | Lee |
| 2005/0187977 | A1 | 8/2005 | Frost |
| 2006/0116989 | A1 | 6/2006 | Bellamkonda et al. |
| 2006/0179255 | A1 | 8/2006 | Yamazaki |
| 2007/0156957 | A1 | 7/2007 | McHardy et al. |
| 2007/0203925 | A1 | 8/2007 | Sandler et al. |
| 2008/0046686 | A1 | 2/2008 | Cameron |
| 2008/0059492 | A1 | 3/2008 | Tarin |
| 2008/0065591 | A1 | 3/2008 | Guzenda |
| 2008/0256250 | A1 | 10/2008 | Wakefield |
| 2008/0281784 | A1 | 11/2008 | Zane et al. |
| 2008/0281865 | A1 | 11/2008 | Price et al. |
| 2008/0294863 | A1 | 11/2008 | Faerber et al. |
| 2009/0037700 | A1 | 2/2009 | Graham |
| 2009/0043910 | A1 | 2/2009 | Barsness |
| 2009/0055350 | A1 | 2/2009 | Branish et al. |
| 2009/0094193 | A1 | 4/2009 | King et al. |
| 2009/0287628 | A1 | 11/2009 | Indeck |
| 2009/0287637 | A1 | 11/2009 | Day et al. |
| 2009/0307290 | A1 | 12/2009 | Barsness et al. |
| 2009/0313210 | A1 | 12/2009 | Bestgen et al. |
| 2010/0030728 | A1 | 2/2010 | Chakkappen et al. |
| 2010/0030796 | A1 | 2/2010 | Netz et al. |
| 2010/0082705 | A1 | 4/2010 | Bhashyam et al. |
| 2010/0088309 | A1 | 4/2010 | Petcelescu et al. |
| 2010/0106944 | A1 | 4/2010 | Symes |
| 2010/0115347 | A1 | 5/2010 | Noyes |
| 2010/0161646 | A1 | 6/2010 | Ceballos et al. |
| 2010/0191918 | A1 | 7/2010 | Lee et al. |
| 2010/0235335 | A1 | 9/2010 | Heman et al. |
| 2010/0278446 | A1 | 11/2010 | Ganesh et al. |
| 2010/0299316 | A1 | 11/2010 | Faerber et al. |
| 2011/0029557 | A1 | 2/2011 | Raghavan et al. |
| 2011/0029569 | A1 | 2/2011 | Ganesh et al. |
| 2011/0106804 | A1 | 5/2011 | Keeler et al. |
| 2011/0138123 | A1 | 6/2011 | Aditya et al. |
| 2012/0054225 | A1 | 3/2012 | Marwah et al. |
| 2012/0166447 | A1 | 6/2012 | Nice |
| 2012/0173515 | A1 | 7/2012 | Jeong et al. |
| 2012/0197868 | A1 | 8/2012 | Fauser |
| 2012/0209873 | A1 | 8/2012 | He |
| 2012/0323971 | A1 | 12/2012 | Pasupuleti |
| 2013/0151567 | A1 | 6/2013 | Ellison et al. |
| 2013/0151568 | A1 | 6/2013 | Ellison et al. |
| 2013/0275364 | A1 | 10/2013 | Wang |
| 2013/0275473 | A1 | 10/2013 | Ellison et al. |
| 2013/0303663 | A1 | 11/2013 | Agnely et al. |
| 2014/0013076 | A1 | 1/2014 | Ganesh et al. |
| 2014/0013077 | A1 | 1/2014 | Ganesh et al. |
| 2014/0013078 | A1 | 1/2014 | Ganesh et al. |
| 2014/0040218 | A1 | 2/2014 | Kimura et al. |
| 2014/0052713 | A1 | 2/2014 | Schauer et al. |
| 2014/0052726 | A1 | 2/2014 | Amberg et al. |
| 2014/0074818 | A1* | 3/2014 | Barber .............. G06F 17/30315 707/714 |
| 2014/0075493 | A1 | 3/2014 | Krishnan et al. |
| 2014/0095748 | A1 | 4/2014 | Aingaran et al. |
| 2014/0096145 | A1 | 4/2014 | Aingaran et al. |
| 2014/0114952 | A1 | 4/2014 | Robinson |
| 2015/0046411 | A1* | 2/2015 | Kazmaier ......... G06F 17/30336 707/693 |
| 2015/0088811 | A1 | 3/2015 | Hase et al. |
| 2015/0088822 | A1 | 3/2015 | Raja et al. |
| 2015/0088824 | A1 | 3/2015 | Kamp et al. |
| 2015/0088830 | A1 | 3/2015 | Kamp et al. |
| 2015/0089125 | A1 | 3/2015 | Mukherjee et al. |
| 2015/0089134 | A1 | 3/2015 | Mukherjee et al. |
| 2016/0007037 | A1 | 1/2016 | Zhao et al. |
| 2016/0210330 | A1 | 7/2016 | Arndt |

(56) References Cited

U.S. PATENT DOCUMENTS

| | | |
|---|---|---|
| 2016/0350347 A1 | 12/2016 | Das et al. |
| 2017/0024435 A1 | 1/2017 | Kociubes et al. |
| 2017/0060587 A1 | 3/2017 | Chavan |

FOREIGN PATENT DOCUMENTS

| | | |
|---|---|---|
| EP | 2 608 070 A1 | 6/2013 |
| GB | 2 306 868 A | 5/1997 |
| JP | 2000261674 A | 9/2000 |
| WO | WO 00/08552 A1 | 2/2000 |
| WO | WO 2007/078444 A1 | 7/2007 |
| WO | WO2010/039895 | 4/2010 |
| WO | WO 2013/095653 A1 | 6/2013 |
| WO | WO 2013/095662 A1 | 6/2013 |

OTHER PUBLICATIONS

U.S. Appl. No. 14/337,142, filed Jul. 21, 2014, Office Action, dated Dec. 24, 2015.
U.S. Appl. No. 14/023,265, filed Sep. 10, 2013, Notice of Allowance, dated Jan. 5, 2016.
U.S. Appl. No. 14/023,249, filed Sep. 10, 2013, Office Action, dated Jan. 20, 2016.
U.S. Appl. No. 14/337,164, filed Jul. 21, 2014, Notice of Allowance, dated Feb. 22, 2016.
U.S. Appl. No. 14/023,064, filed Sep. 10, 2013, Office Action, dated Mar. 28, 2016.
Zhou et al., "Efficient SIMD Optimization for Media Processors", Journal of Zhejiang University Science A, dated Apr. 2008, 7 pages.
Zukowski, M. "Vectorwise: Beyond Column Stores" ACTIAN 2012, 17 pages.
Wikipedia, "SIMD", Single Instruction Multiple Instruction, dated Jan. 1, 2013, 7 pages.
Wikipedia, "In Memory Database", Dated Jan. 30, 2013, 4 pages.
Weinhardt, Markus, "Compilation and Pipeline Synthesis for Reconfigurable Architectures", 1997, 8 pages.
W. Cockshott et al., "High-Performance Operations Using a Compressed Database Architecture", The Computer Journal, vol. 41, 1998, 14 pages.
Silva et al., "Using a Tighly-Coupled Pipeline in Dynamically Reconfigureable Platform FPGAs", dated May 2003, 4 pages.
Schmit et al., "PipeRench: A Virtualized Programmable Datapath in 0.18 Micron Technology", dated 2002, 4 pages.
Park et al., "Polymorphic Pipeline Array: A Flexible Multicore Accelerator with Virtualized Execution for Mobile Multimedia Applications", Dated Dec. 12, 2009 11 pages.
Dynamic Scheduling Techniques, http://www.cs.iastate.edu/~prabhu/Tutorial/PIPELINE/dynamSchedTech.html, printed on Jul. 4, 2012, 2 pages.
CCCP: Accelerator Virtualization, http://cccp.eecs.umich.edu/research/virtual.php, printed on Jul. 4, 2012, 3 pages.
"MonetDB", Wikipedia, available: http://en.wikipedia.org/wiki/MonetDB, dated May 16, 2012, 3 pages.
"Column Store Features" monedb, available: http://moneybd.org/Home/Features, dated 2008-2013, 3 pages.

U.S. Appl. No. 14/337,183, filed Jul. 21, 2014, Notice of Allowance, dated Apr. 24, 2015.
IBM, "Technical Disclosure Bulletin", Data Packing and Unpacking Scheme for High Performance Image Processing, vol. 36, No. 7, dated Jul. 1993, 6 pages.
Schaffner, et al., "A Hybrid Row-Column OITP Database Architecture for Operational Reporting", dated 2009, 14 pages.
Ramamurthy, Ravishankar, "A Case for Fractured Mirrors" Proceedings of the 28th VLDB Conference, dated, 2002, 12 pages.
IBM Technical Disclosure Bulletin, "Data Packing and Upacking Scheme for High Performance Image Processing", vol. No. 7, dated Jul. 1993, 6 pages.
Farber et al., "SAP HANA Database—Data Management for Modern Business Applications", SIGMOD Record, dated Dec. 2011, vol. 40, No. 4, 8 pages.
U.S. Appl. No. 14/023,249, filed Sep. 10, 2013, Office Action, dated Aug. 25, 2016.
U.S. Appl. No. 14/023,064, filed Sep. 10, 2013, Final Office Action, dated Oct. 6, 2016.
U.S. Appl. No. 14/337,182, filed Jul. 21, 2014, Interview Summary, dated May 8, 2015.
Nirmesh Malviya, "Recovery Algorithms for In-Memory OLTP Databases", Master of Science Thesis, dated Jul. 1, 2012, 66 pages.
U.S. Appl. No. 14/337,182, filed Jul. 21, 2014, Final Office Action, dated Jul. 17, 2015.
U.S. Appl. No. 14/337,179, filed 074/21/2014, Notice of Allowance, dated Jul. 29, 2015.
Ganesh, U.S. Appl. No. 14/023,249, filed Sep. 10, 2013, Notice of Allowance, dated Feb. 27, 2017.
Coprocessor Wizard, Platform Studio, http://www.xilinx.com/itp/xilinx10/help/platform_studio/ps_c_cpw_coprocessor_wizard.htm, 2008, 2 pages.
Binkert et al., "A Simple Integrated Network Interface for High-Bandwidth Servers", dated Jan. 2006, 22 pages.
Meikel Poess et al., "Data Compression in Oracle", Proceedings of the 29th VLDB Conference, Berlin German, dated Sep. 9-12, 2003, 11 pages.
Anonymous:, "Hash Table—Wikipedia, the free encyclopedia", dated Jun. 20, 2012, retrieved from the internet: http://wayback.archive.org/wiki/harshtable 18 pages.
U.S. Appl. No. 14/337,179, filed Jul. 21, 2014, Office Action, dated Dec. 29, 2014.
Thekkath et al., "Separating Data and Control Transfer in Distributed Operating Systems", ASPLOS, San Jose, ACM, dated 1994, 10 pages.
O'Brien, Frank, "The Appollo Guidance Computer—Architecture and Operation", dated 2010, Springer, pp. 27-28, 54, 76 and 1414.
Chandramohan A. Thekkath et al. "Separating Data and Control Transfer in Distributed Operating Systems", Architectural Support for Programming Languages and Operating Systems, dated Nov. 1, 1994, 10 pgs.
Brown, U.S. Appl. No. 15/074,248, filed Mar. 18, 2016, Office Action dated Sep. 25, 2017.
Brown, U.S. Appl. No. 15/073,905, filed Mar. 18, 2016, Office Action dated Sep. 25, 2017.

\* cited by examiner

FIG. 4

METHODS AND SYSTEMS FOR FAST SET-MEMBERSHIP TESTS USING ONE OR MORE PROCESSORS THAT SUPPORT SINGLE INSTRUCTION MULTIPLE DATA INSTRUCTIONS

CROSS-REFERENCE TO RELATED APPLICATIONS; BENEFIT CLAIM

This application claims the benefit of Provisional App. No. 61/880,852, filed Sep. 21, 2013, under 35 U.S.C. § 119(e). The entire contents of Provisional App. No. 61/880,852 are hereby incorporated by reference as if fully set forth herein.

The application is related to, and incorporates by reference, the following U.S. Applications: U.S. Provisional Application No. 61/801,207 filed Mar. 15, 2013; U.S. patent application Ser. No. 14/023,064 filed Sep. 10, 2013; U.S. patent application Ser. No. 14/023,249 filed Sep. 10, 2013; and U.S. patent application Ser. No. 14/023,265 filed Sep. 10, 2013.

FIELD OF THE INVENTION

The present invention relates to set-membership tests and more specifically to parallel set-membership tests optimized to use single instruction multiple data instructions.

BACKGROUND

Determining which values in a first set of values are members of a second set of values may be computationally expensive. The larger the first set and/or the second set is, the more time is required to determine which values in the first set of values are members of a second set of values. For purposes of illustrating a clear example, assume the following:

A database has a table named "OrbitingObjects", which has a particular column named "Type"; and
A database server receives the following query: "SELECT count(Type) FROM OrbitingObjects WHERE Type='rocket' OR Type='station';".

To respond to the query, the database server must determine which values in the particular column are members of a second set. In this case, the second set is the set of values that match "rocket" or "station". The more rows in the column Type, the longer the database server may take to determine which rows in the Type column satisfy the condition: "WHERE Type='rocket' OR Type='station'".

Furthermore, some types of conditions are computationally expensive. For instance, in the previous example, the database server may perform a string comparison between each value in the Type column and the two condition values: "rocket" and "station".

Some database systems rely on using newer processing units with higher processing speeds to determine which rows in a column satisfy one or more conditions in a query and return results more quickly. However, the performance of typical processing units is not increasing at the same rate as the quantity of the data upon which database operations are performed. Thus, database and other software developers are not able to rely as much on increasing computer power to more quickly evaluate which values in a first set of values are members of a second set of values.

Single instruction multiple data ("SIMD") processors perform the same operation on multiple data items simultaneously. SIMD processors exploit data level parallelism by executing a single instruction against data in multiple registers or subregisters. Thus, the throughput per instruction may be increased accordingly.

SIMD processors are typically used for graphic and other multimedia applications. Exploiting the SIMD architecture to evaluate which values in a first set of values are members of a second set of values may be difficult. For example, many SIMD processors cannot branch to a first operation after evaluating a first value in a first subregister, and branch to a second operation after evaluating a second value in a second subregister, in parallel. Thus, if a first column value satisfies a condition, but a second column value does not satisfy the same condition, then some SIMD architectures do not have a mechanism to branch to a first operation to indicate the particular column value satisfied the condition, while branching in parallel to a second operation to indicate the second column value did not satisfy the condition.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

TERMS AND NOTATION

For purpose of explanation, the following terms and conventions are used herein to describe embodiments of the invention:

The term "byte" herein describes number of contiguously stored bits. While the common usage implies eight bits, the size of a byte may vary from implementation to implementation. For example a byte may refer to any size including four bits, eight bits, sixteen bits, thirty-two bits, sixty-four bits, and so on.

The notation <XY> herein describes a vector of bits, e.g., <10>. Spaces and/or commas may be added between bits merely to increase the ability to read the contents of the vector, e.g., <11110000, 1111 0000>. To be consistent with the other examples herein, the "first" bit, "lowest" bit, or "least significant" bit is the right-most bit; the "last" bit, "highest" bit, or "most significant" bit is the left-most bit. In an embodiment bits in a vector bit may be ordered differently.

The terms "lowest-aligned" and "highest-aligned" indicate whether a value is stored in a register's lowest bits or highest bits, respectively. For example, if a value is "lowest-aligned" in a register, then the value is stored in the register's lowest bits; and if a value is "highest-aligned" in a register, then the value is stored in the register's highest bits. For purposes of illustrating clear examples herein, the term "right-aligned" means lowest-aligned, and the term "left-aligned" means highest-aligned.

The notation [J, K] herein describe a set of values, where J is a first value and K is a second value, which may be equal or different unless specifically stated otherwise. For example, J could be a value in a first row of a database column and K may be a value in a second row of the database column. Also for example, J may be a first value in a dictionary and K may be a second value in a dictionary.

The term "register" is a register or subregister that may include one or more smaller subregisters. Unless otherwise specified a register may be a SIMD register or a register typically used in the scalar processor.

While each of the drawing figures illustrates a particular embodiment for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Several processes are presented herein for determining which values in a first set of values are members of a second set of values in parallel using SIMD architecture. While the examples illustrated herein focus on satisfying conditions in a database query, the processes and systems discussed herein may be used in other applications using SIMD architecture.

SIMD Instructions

A SIMD instruction is an instruction that, when processed, may cause an operation to be performed multiple times, simultaneously and/or in parallel, on multiple distinct data values. For the purpose of illustrating a clear example, assume four integer values are to be incremented by one. Also assume that a SIMD processor receives a single SIMD Increment by One instruction. In response to receiving the single SIMD instruction, the SIMD processor may increment each of the four integer values simultaneously.

In contrast, a scalar instruction is an instruction that, when processed, may cause an operation to be performed once. Multiple scalar instructions may be processed serially within a scalar processor, processing unit, or processing core. Assume, for purposes of illustrating a clear example, the same four values in the previous example are to be incremented by one on a scalar processor. The scalar processor may execute a first scalar Increment by One instruction, causing the first value to be incremented by one; then, the scalar processor may execute a second scalar Increment by One instruction, causing the second value to be incremented by one, and so on. Thus, in this example, the scalar processor must execute three more Increment by One instructions than the SIMD processor in the previous example. Furthermore, assume that the scalar processor performs a scalar Increment by One instruction as quickly as the SIMD processor executes a SIMD Increment by One instruction. Because the scalar processor performs scalar instructions serially, and the SIMD processor performs a SIMD instruction on multiple data objects in parallel, the scalar processor may take four times longer to process all four values than the SIMD processor.

One approach for implementing a SIMD operation is to use one or more registers that are each capable of storing multiple distinct data values. Such registers are referred to herein as SIMD registers. Assume, for purposes of illustrating a clear example, that a SIMD register is capable of storing 256 bits. Accordingly, the SIMD register is capable of storing eight distinct 32-bit values, each in a 32-bit subregister; four distinct 64-bit values, each in a 64-bit subregister; or two distinct 128-bit values, each in a 128-bit subregister. Additionally or alternatively, non-power-of-two sized subregisters may be used.

A SIMD operation implemented in hardware and may take one or more machine cycles to execute. For example, a scalar processor, in response to receiving a Shift Right instruction, may shift bits representing a single value in a register to the right in a single cycle. A SIMD processor, in response to receiving a Shift Right instruction, may shift bits in multiple SIMD registers, or SIMD subregisters, in parallel, in a single cycle. Additionally or alternatively, a SIMD Shift Right instruction may be a Variable Shift Right instruction, which shifts bits to the right in each SIMD subregister, but independently of the other subregisters in the same SIMD register. Additionally or alternatively, one or more SIMD instructions may take more than one cycle to execute.

A computer system that implements both SIMD and non-SIMD instructions may include one or more SIMD registers and one or more non-SIMD registers. Additionally or alternatively, a register may be a SIMD register for purposes of executing SIMD instruction and a non-SIMD register for purposes of executing a non-SIMD instruction. Additionally or alternatively, SIMD registers may be on a different hardware element (for example, a different coprocessor) than the hardware element on which non-SIMD registers reside.

Dictionaries

A dictionary may comprise one or more entries. Each entry has a dictionary index and a dictionary value. The dictionary index may be implied. For example, a dictionary may be an array of values, and the dictionary index for the fifth value may, in a zero-based array, implicitly be four. Each dictionary value may, but need not be, unique from all other dictionary values in the same dictionary.

A database server, and/or an administrator may cause a database server, to generate a dictionary for a particular column in a database. For purposes of illustrating a clear example, assume a database table has a column named "Type". Further assume that, of the values currently stored in the "Type" column, there are four unique values: "rocket", "planet", "station", "moon". Under these circumstances, a database server may create a dictionary comprising an array of entries with the following dictionary values: ["rocket", "planet", "station", "moon"]. The dictionary index for each dictionary value in a zero-based indexed array is as follows:

|         | DICTIONARY INDEX | DICTIONARY VALUE |
|---------|------------------|------------------|
| ENTRY 1 | 0                | "rocket"         |
| ENTRY 2 | 1                | "planet"         |
| ENTRY 3 | 2                | "station"        |
| ENTRY 4 | 3                | "moon"           |

In an embodiment, the dictionary values may be sorted before they are indexed. For example, ["rocket", "planet", "station", "moon"] may first be sorted alphabetically. However, the examples herein the dictionary values are not sorted.

Once a dictionary has been created for a column, the column may be "encoded" by storing dictionary index values in the database column, instead of the actual column values. Continuing with the previous example, assume that the table has five rows, populated as follows:

|      | TYPE COLUMN | OTHER COLUMNS |
|------|-------------|---------------|
| ROW1 | rocket      | ...           |
| ROW2 | planet      | ...           |
| ROW3 | moon        | ...           |
| ROW4 | rocket      | ...           |
| ROW5 | station     | ...           |

In this example, replacing the values in the type column with dictionary-encoded values produces the following table:

|      | DICTIONARY-ENCODED TYPE COLUMN | OTHER COLUMNS |
|------|--------------------------------|---------------|
| ROW1 | 0                              | ...           |
| ROW2 | 1                              | ...           |
| ROW3 | 3                              | ...           |
| ROW4 | 0                              | ...           |
| ROW5 | 2                              | ...           |

As illustrated by this example, each dictionary-encoded column value is the dictionary index of the original value. For example, the dictionary-encoded value of row1 is zero, and zero is the dictionary index of the dictionary value "rocket".

Dictionary Bit-Vectors

A dictionary bit-vector is a bit-vector that indicates which dictionary value(s), if any, satisfy one or more conditions in a query. The position of each bit in the dictionary bit-vector corresponds with a dictionary entry. A bit in a dictionary bit-vector that is set to one indicates that the corresponding dictionary entry is for a value that satisfies each of the one or more conditions. On the other hand, a bit in the dictionary bit-vector that is set to zero indicates that the corresponding dictionary entry is for a value that does not satisfy each of the one or more conditions.

For purposes of illustrating a clear example, assume the facts in the previous example and further assume that the database server has received a query for a count of all rows in the dictionary-encoded column "Type" with a column value of either "rocket" or "station". The database server may evaluate the condition ("WHERE Type='rocket' OR Type='station'") on each dictionary value and generate the following dictionary bit-vector: <0, 1, 0, 1>. The first bit in the dictionary bit-vector corresponds to the first entry in the dictionary. The first bit is set to one because the dictionary value ("rocket") at dictionary index zero satisfies the condition ("WHERE Type='rocket' OR Type='station'").

Similarly, the last bit in the dictionary bit-vector corresponds to the last dictionary entry (entry four). The last bit (fourth bit) is set to zero because the dictionary value ("moon") of dictionary entry four does not satisfy the condition ("WHERE Type='rocket' OR Type='station'").

Output Bit-Vectors

An output bit-vector is a bit-vector that indicates which values in a set of values satisfy one or more conditions in a query. For one or more database applications specifically, an output bit-vector is a bit-vector that indicates which rows of a table contain values that satisfy one or more conditions in a query. For example, an output bit-vector for a table with fifty rows will have fifty bits, each of which corresponds to a distinct row of the table. The value of each bit in bit-vector indicates whether the corresponding row has values that satisfy one or more conditions in a query. The position of each bit in the output bit-vector indicates the row of the table to which the bit corresponds.

When the condition is a condition on a dictionary-encoded column, each bit in an output bit-vector that is set to one indicates that the corresponding row has a dictionary-encoded value that corresponds to a dictionary value that satisfies the condition. Conversely, each bit in an output bit-vector that is set to zero indicates that the corresponding row has a dictionary-encoded value that corresponds to a dictionary value that does not satisfy the condition.

For purposes of illustrating a clear example, assume the facts in the previous example. Based on the condition ("WHERE Type='rocket' OR Type='station'"), the database server may generate the output the bit-vector <1, 1, 0, 0, 1 >.

In the above example, the first bit in the output bit-vector is set to one because the first bit corresponds to the first dictionary-encoded row or column value: zero. The first bit in the corresponding dictionary bit-vector is "1", indicating that the first row in the dictionary-encoded column (Type) corresponds with a dictionary value that satisfies each of the one or more conditions based on the dictionary-encoded column (Type).

Similarly, the second bit is set to zero because the second bit in the output bit-vector corresponds to the second dictionary-encoded row or column value: one. The first bit in the corresponding dictionary bit-vector is "0", indicating that the second row in the dictionary-encoded column (Type) corresponds with a dictionary value that does not satisfy each of the one or more conditions based on the dictionary-encoded column (Type).

Furthermore, the last bit (fifth bit) is set to one because the fifth bit corresponds to the fifth dictionary encoded row or column value: two. The second bit in the corresponding dictionary bit-vector is "1", indicating that the fifth row in the dictionary-encoded column (Type) corresponds with a dictionary value that satisfies each of the one or more conditions based on the dictionary-encoded column (Type).

Set-Membership Processes

Discussed herein are set-membership processes for determining which values in a first set of values are members of a second set of values using SIMD architecture. Each set-membership process, and/or each step of the process, may be performed on multiple values in parallel.

Each set-membership process may generate an output bit-vector. Each process may be repeated until all the values in a set, such as values in a dictionary-encoded database table column, are processed and/or stored in an output bit-vector.

Determining which Set-Membership Process to Use

Determining which set-membership process to use may be based on the cardinality of the set, such as the cardinality of the values in a dictionary-encoded column. Additionally or alternatively, determining which set-membership process to use may be based on the size of one or more SIMD registers, preference of a user (such as a database administrator and/or developer), and/or one or more other factors.

The cardinality of a set is the number of unique values that the set has or may have. For purposes of illustrating a clear example, assume that values in a particular database column have 32 possible unique values: 0-31. The cardinality of the database column is 32.

The number of numerals used to represent each value is defined as ceiling($\log_b$ C), where C is the cardinality and b is the base of the numerals. For example, the number of bits used to represent a set with a cardinality of 32 is ceiling($\log_2$ 32), which is five. Also for example, the number of bits used to represent a column with a cardinality of 33 is ceiling($\log_2$ 33), which is six.

Cardinality is "low" if $C\alpha \leq max(reg\_bits)$, where C is the cardinality of a column value, $\alpha$ is an integer greater than one, and max(reg_bits) is the maximum number of bits that a SIMD register is capable of storing. In an embodiment, $\alpha$ is a power of two, such as 2, 4, 8, 16, and so on. For purposes of illustrating a clear example, assume C is 32, $\alpha$ is 2, and max(reg_bits) is 256. Since $C\alpha$ is 64, and max(reg_bits) is 256, then the cardinality of the column value is low because 64 is less than 256.

Cardinality is "high" if $C\alpha > max(reg\_bits)$. For purposes of illustrating a clear example, assume C is 1024, $\alpha$ is 2, and max(reg_bits) is 256. Since $C\alpha$ is 2048, and max(reg_bits) is 256, then the cardinality of the column value is high because 2048 is greater than 256.

The variable $\alpha$ may be adjusted according to the preference of the SIMD processor executing one or more of the processes discussed herein. Additionally or alternatively, the variable $\alpha$ may be set by a user, such as a database administrator and/or developer. Additionally or alternatively, the variable $\alpha$ may be based on one or more other factors.

In response to receiving a query with one or more conditions for a particular dictionary-encoded column, the database server may determine whether the cardinality of the column is low or high. If the cardinality for the column is low, then the database server may use the first set-membership process discussed herein to determine which rows in the column are associated with dictionary values that satisfy each of the one or more conditions. Otherwise, the database server may use the second set-membership process discussed herein to determine which rows in the column are associated with dictionary values that satisfy each of the one or more conditions. In an embodiment, the database server may use the second set-membership process regardless of cardinality.

A database server may apply the set-membership processes discussed herein to different columns independently.

For example, if a query has one or more first conditions for a first dictionary-encoded column and one or more second conditions for a second dictionary-encoded column, then the database server may determine the cardinality of the first column and the second column independently. If the cardinality for the first column is low and the cardinality for the second column is high, then the database server may use the first set-membership process on the first column and the second set-membership process on the second column.

A First Set-Membership Process for Sets with Low Cardinality

Figure 1:
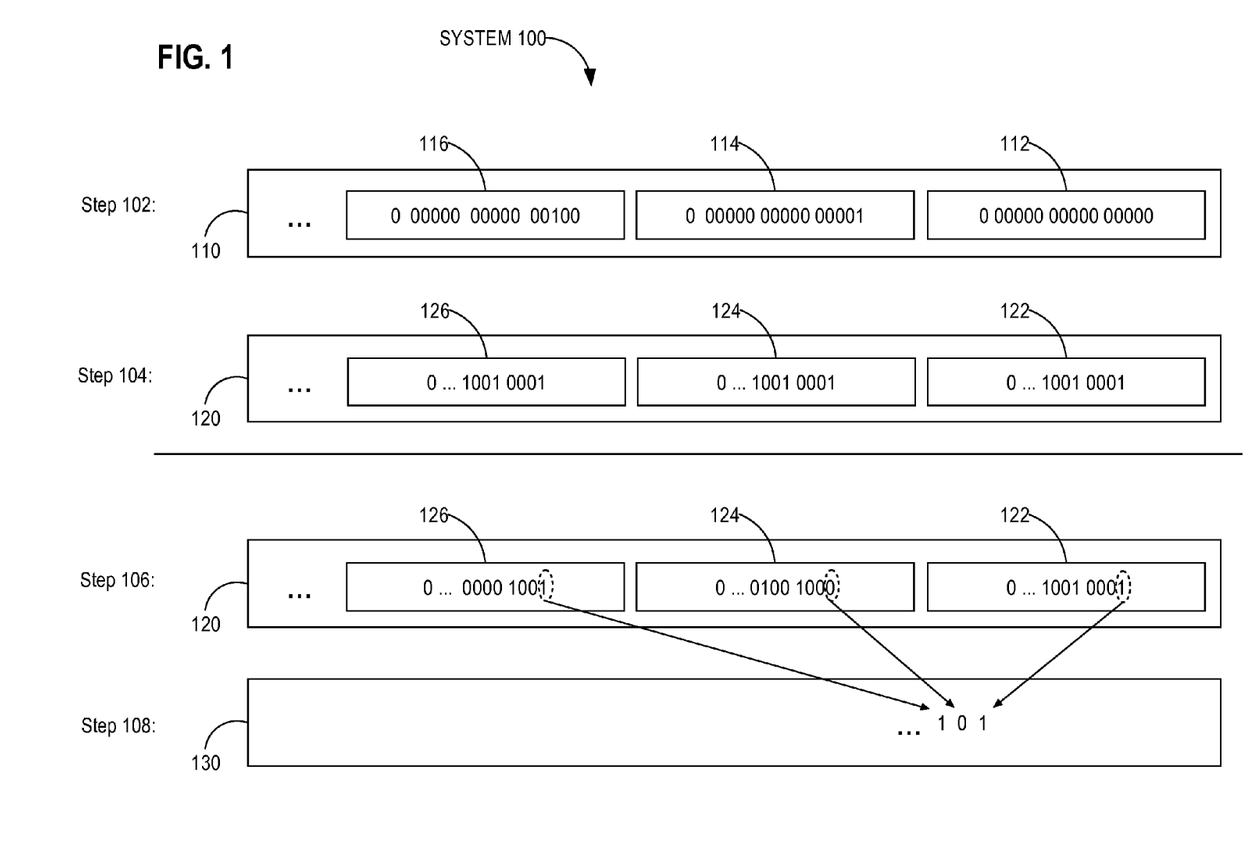
FIG. 1 illustrates a set of SIMD registers and the states of the SIMD registers at various steps of performing a first set-membership process, in an embodiment.

The first set-membership process discussed herein is specialized for sets with low cardinality. FIG. 1 illustrates a set of SIMD registers, in an embodiment. In FIG. 1, a SIMD processor comprises SIMD register 110 and SIMD register 120. SIMD register 110 comprises subregister 112, subregister 114, and subregister 116. SIMD register 120 comprises subregister 122, subregister 124, and subregister 126. Storage 130 may be a register and/segments in memory that holds an output bit-vector generated by one or more processes discussed herein.

FIG. 1 also illustrates the states of the SIMD registers at various steps of performing the first set-membership process, in an embodiment. For purposes of illustrating a clear example, assume the following:

The cardinality of a column in a database table is 32.
There are 1,000,000,000 rows in the database table.
The column value in each row is dictionary-encoded with 5 bits.
Each value in the column is a value between zero and one minus the cardinality of the column, which in this case is 31.
A query has been received that includes one or more conditions based on the column
The database server has evaluated the one or more conditions on the dictionary values and generated the following dictionary bit-vector: <0000 0000, 0000 0000, 0000 0000, 1001 0001>. The bit-vector is the same width as the cardinality of the column: 32 bits.
Each SIMD register is 256 bits wide.

In step 102, one or more dictionary-encoded column values are loaded in one or more subregisters of a SIMD register. For example, the SIMD processor loads a plurality of bit-packed, fixed-width values into subregisters in SIMD register 110: < . . . 00100 00001 00000>. The width of each value is 5 because the cardinality is 32. Each fixed-width value is a dictionary-encoded column value. Accordingly, a first dictionary-encoded column value (zero) is loaded in subregister 112, a second dictionary-encoded column value (one) is loaded in subregister 114, and a third dictionary-encoded column value (four) is loaded in subregister 116.

Loading Dictionary-Encoded, Fixed-Width, Bit-Packed Values (or Dictionary Indexes) in a Plurality of Subregisters in a Single SIMD Register Using One or More SIMD Operations Fixed-width, bit-packed values may be loaded in a plurality of subregisters in a single SIMD register using various methods. For example, a plurality of values in a fixed-width, bit-packed vector of values may be loaded in a plurality of subregisters in a single SIMD register using the "bunpk" operation. The bunpk operation is described in detail in U.S. Provisional Application No. 61/801,207, U.S. Non-Provisional application Ser. No. 14/023,064, U.S. Non-Provisional application Ser. No. 14/023,249, and U.S. Non-Provisional application Ser. No. 14/023,265, all of which are incorporated by reference herein.

Figure 2:
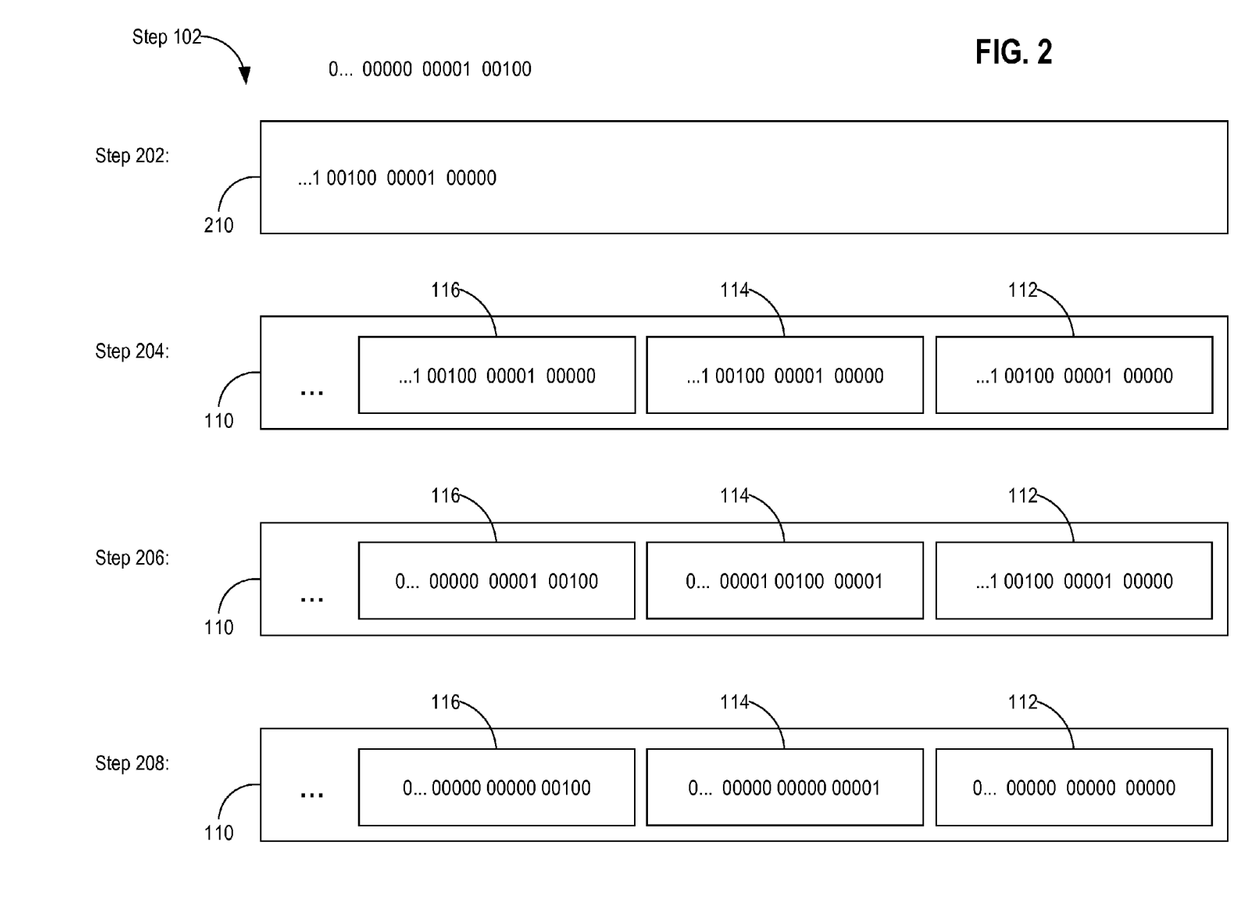
FIG. 2 illustrates a set of SIMD registers and the states of the SIMD registers at various steps of loading a plurality of values in a fixed-width, bit-packed vector of values, in an example embodiment.

Additionally or alternatively, if the bunpk operation, or another operation that loads values from a fixed-width, bit-packed vector of values into a plurality of subregisters in a single SIMD register, is not available, then the operations discussed in relation to the bunpk operation may be used: a Load, Shuffle, Variable-Shift, and Mask/And. FIG. 2 illustrates a set of SIMD registers and the states of the SIMD registers at various steps of loading a plurality of values in a fixed-width, bit-packed vector of values, in an example embodiment.

In step 202, a fixed-width, bit-packed vector of values are loaded in a register. A Load operation loads a particular number of bytes into register. In the current example, each SIMD register is 256 bits wide. Thus, each SIMD register includes eight 32-bit subregisters. Accordingly, eight row values in the database column may be loaded in a SIMD register, such as SIMD register 110, at a time. For purposes of illustrating a clear example, the first three fixed-width, bit-packed values, and an additional bit, are illustrated in register 210.

In step 204, words in a register are shuffled into subregisters in a SIMD register. A Shuffle operation is a SIMD operation that retrieves sets of one or more bytes from a register, and loads each set in a SIMD subregister. The width of each subregister is the width of the cardinality of the values in the fixed-width, bit-packed vector of values, which are the same as the cardinality of the dictionary-encoded column values. Accordingly, in the example illustrated in FIG. 2, the Shuffle operation is used to load the first 32 bits from register 210 into subregister 112, subregister 114, and subregister 116.

In step 206, the bits in each subregister in a SIMD register are shifted to align the fixed-bit representation of each value with the low end of each subregister, respectively. A Variable-Shift operation is a SIMD operation that shifts one or more subregisters in a single SIMD register by a variable amount. In the examples herein, the right-most bit of each register is the low end. Thus, a variable-right-shift operation is used to shift subregister 112 by zero bits, subregister 114 by five bits, and subregister 116 by ten bits.

The number of bits that a bit-vector is shifted by to right-align the value in a register is referred to herein as a bit-offset. A bit-offset may be calculated many ways. In an embodiment, the bit-offset for each subregister is calculated using the following equation, where i is the base-zero index of the value in the vector of values:

$$\text{bit\_offset}(i) = (i * \text{value\_width}) \bmod \text{subregister\_size}.$$

In the current example, for the first value (<00000>) in the vector of values, i is zero, value_width is five because the width of each value in the bit-packed fixed-width vector of values is five, and subregister_size is 32 because each subregister in SIMD register 110 is 32 bits wide. Thus, the bit-offset for subregister 112 is zero, because zero modulo 32 is zero. For the second value (<00001>) in the vector of values, i is one, and value_width and subregister_size are the same as the previous example. Thus, the bit-offset for subregister 114 is five, because five modulo 32 is five.

Additionally or alternatively, step 206 may be performed by using a SIMD integer divide operation. Dividing a value stored in a register by $2^n$ shifts the bits in the register n places lower. For example, after step 204, subregister 116 contains < . . . 1 00100 00001 00000>. If subregister 116 is divided by $2^{10}$, then the bit-vector in subregister 116 is shifted to the right 10 places to be <0 . . . 1 00100>. Thus, instead of using a variable-right-shift operation in step 206, a SIMD integer divide operation may be used to shift subregister 112 by zero bits, subregister 114 by five bits, and subregister 116 by ten bits, by dividing each subregister by $2^0$, $2^5$, and $2^{10}$ respectively.

In step 208, the upper bits, which are not part of the fixed-width value, in each subregister are masked out. An And operation may be used to mask out the upper bits of each subregister. In the example illustrated in FIG. 2, the 27 high bits of each subregister in SIMD register 110 are masked out by applying following 32-bit mask-bit-vector to each subregister: <0000 0000, 0000 0000, 0000 0000, 0001 1111>. The state of each register after step 208 includes the intended fixed-width value properly aligned in each subregister in the SIMD register. Thus, after step 208, and as illustrated in FIG. 2, subregister 112 holds a 32-bit representation of the value zero, subregister 114 holds a 32-bit representation of the value one, and subregister 116 holds a 32-bit representation of the value four.

Additionally or alternatively, step 206 and/or step 208 may be performed by using a SIMD multiply and uniform-shift based on a set of inverted bit-offsets. A SIMD multiply may be used to store the value in each subregister in the most significant bits of the subregister. Thus, in the current example, a SIMD multiply may be used to left-align a value in a subregister. After the fixed-width value in each subregister is left-aligned, a uniform-shift operation may be used to right-align each value.

Multiplying a value stored in a register by $2^n$ shifts the bits in the register n places higher. For example, after step 204, subregister 114 contains < . . . 1 00100 00001 00000>. If subregister 114 is multiplied by $2^{22}$, then the bit-vector in subregister 114 is shifted to the left 22 places to be <00001 0 . . . >, which makes the value left-aligned in subregister 114.

The number of bits a bit-vector is shifted by to left-align the value in a register is referred to herein as an inverted bit-offset. An inverted bit-offset may be calculated may ways. In an embodiment, the inverted bit-offset for each subregister is calculated by using the following equation, where i is the base-zero index of the value in the vector of values:

$$\text{subregister\_size} - (\text{value\_width} + \text{bit\_offset}_i)$$

For example, the inverted bit-offset for subregister 112 is 27, which is the width of the subregister (32), minus the sum of the width of the fixed-width value (five) and the bit-offset (zero). The inverted bit-offset for subregister 114 is 22, which is the width of the subregister (32), minus the sum of the width of the fixed-width value (five) and the bit-offset (five). The inverted bit-offset for subregister 116 is 17, which is the width of the subregister (32), minus the sum of the width of the fixed-width value (five) and the bit-offset (ten).

After left-aligning the fixed-width value in each register, then the uniform-shift operation is used to right-shift the bits in each subregister by the number of bits in the subregister minus the width of the value in the subregister. Thus, continuing with the previous example, the bits in each subregister of SIMD register 110 are each right-shifted by 27 bits, which is the width of each subregister (32) minus the width of each value (five), respectively. After performing the uniform-shift operation, the value in each subregister in SIMD register 110 are right-aligned.

In an embodiment, if a set of SIMD instructions for a particular hardware set does not support the variable-right-shift operation and/or a SIMD divide operation, then the SIMD multiply and uniform-shift operations may be used to right-align the values in each subregister in a SIMD subregister. Additionally or alternatively, if a particular hardware set does not support SIMD instructions then a multiply and shift may be used on values in non-SIMD registers.

Splatting the Dictionary Bit-Vector into a Plurality of Subregisters

In step 104, the dictionary bit-vector is splatted into each subregister in a SIMD register. The SPLAT operation copies bytes from a register, or memory, into each subregister in a SIMD register. In the current example, the dictionary bit-vector is 32 bits wide and the width of SIMD register 120 is 256 bits wide. Thus, the dictionary bit-vector may be splatted into eight subregisters in SIMD register 120. For purposes of illustrating a clear example, the first three subregisters in SIMD register 120 are shown in FIG. 1: subregister 122, subregister 124, and subregister 126. Subregister 122, subregister 124, and subregister 126, each include a copy of the dictionary bit-vector. For purposes of illustrating a clear example, the first eight bits and the last bit are illustrated in subregister 122, subregister 124, and subregister 126.

Shifting the Dictionary Bit-Vector in Each Subregister by a Variable Number

In step 106, the dictionary bit-vector in each subregister of the SIMD register is shifted to place the bit that corresponds with the column value (or dictionary index) into the lowest bit. For example, a Variable-Right-Shift operation is used to shift the dictionary bit-vector in each subregister of SIMD register 120 by the column value in each respective subregister of SIMD register 110. Thus, the bit that corresponds with the column value (or dictionary index) in each subregister of SIMD register 110 is in the lowest bit in each respective subregister of SIMD register 120. Accordingly, and as illustrated in FIG. 1, in step 106, the bits in subregister 122 are shifted to the right by the value loaded in subregister 112 (zero), the bits in subregister 124 are shifted to the right by the value loaded in subregister 114 (one), and the bits in subregister 126 are shifted to the right by the value loaded in subregister 116 (four).

Generating an Output Bit-Vector for Each Column Value

In step 108, the lowest bit in each subregister of the SIMD register that holds the dictionary bit-vector is copied to an output bit-vector in a register and/or memory. A Move-Mask operation is a SIMD operation that applies a mask to each subregister in a single SIMD register and copies the bit(s) not masked out to another register and/or memory. In the current example, the Move-Mask operation is used to apply a mask, such as <0 . . . 01>, to mask out all but the lowest bit in each subregister in SIMD register 120, and copy the lowest bit into storage 130. In the example embodiments illustrated in FIG. 1, and discussed above, the set-membership process, and/or each step of the process, is performed on eight dictionary-encoded column values in parallel. The process may be repeated until the 1,000,000,000 column values are processed. The resulting output bit-vector is 1,000,000,000 bits long.

A Second Set-Membership Process for Sets with High or Low Cardinality

Figure 3A:
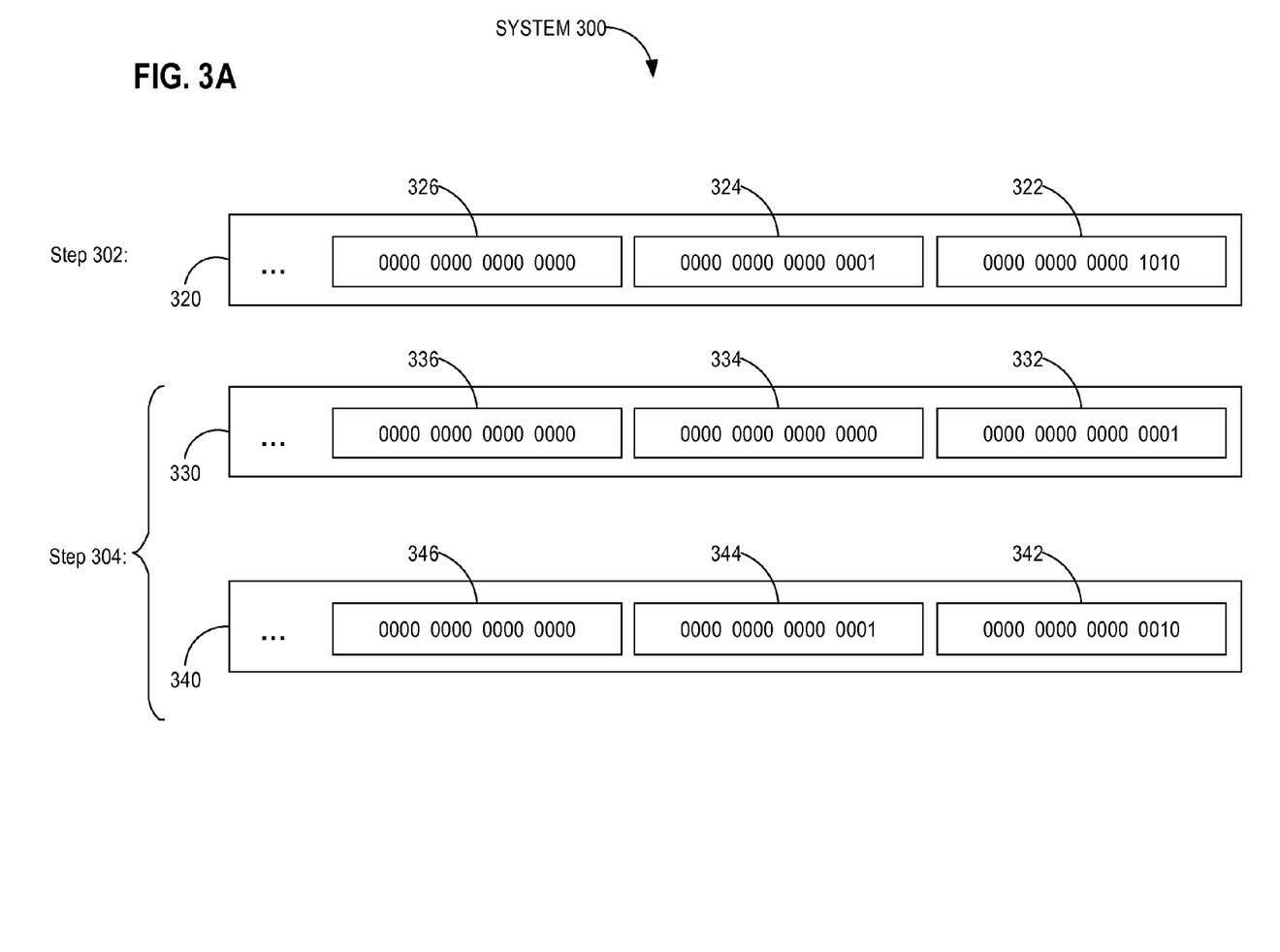
FIG. 3A and FIG. 3B illustrate a set of SIMD registers, scalar registers, and/or memory spaces and the states of the registers, memory spaces, and/or storages at various steps of performing the second set-membership process, in an example embodiment.
Figure 3B:
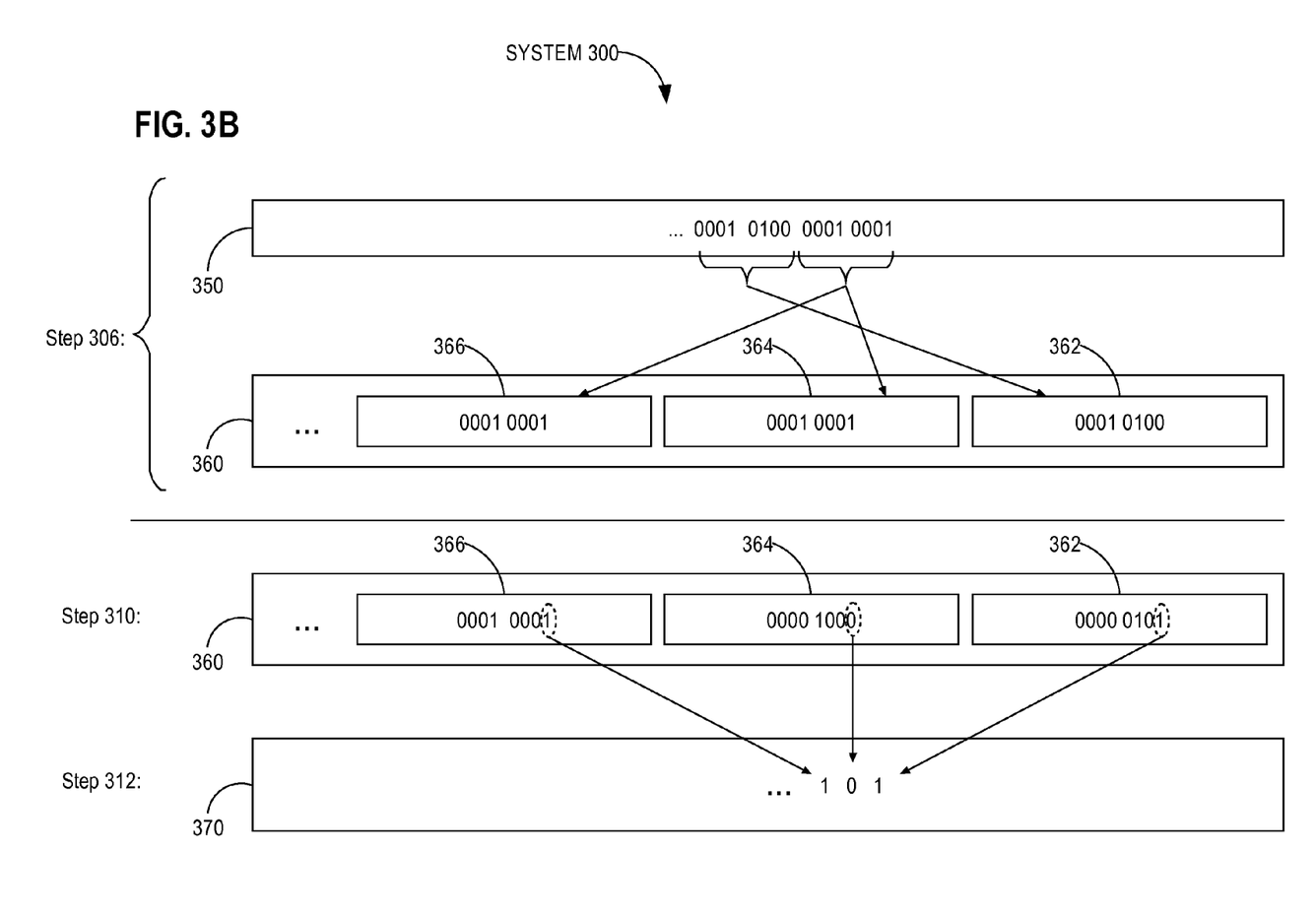

The second set-membership process discussed herein may be used for column values with high or low cardinality. FIG. 3A and FIG. 3B illustrate a set of SIMD registers, scalar registers, and/or memory spaces and the states of the registers, memory spaces, and/or storages, in an example embodiment. For example, system 300 comprises SIMD register 320, SIMD register 330, SIMD register 340, storage 350, SIMD register 360, and storage 370. SIMD register 320 comprises subregister 322, subregister 324, and subregister 326. SIMD register 330 comprises subregister 332, subregister 334, and subregister 336. SIMD register 340 comprises subregister 342, subregister 344, and subregister 346. SIMD register 360 comprises subregister 362, subregister 364, and subregister 366. Storage 350 and storage 370 may be one or more registers, segments in cache, segments in memory, and/or disk.

FIG. 3A and FIG. 3B also illustrate the states of the registers, memory spaces, and/or storages at various steps of performing the second set-membership process, in an example embodiment. For purposes of illustrating a clear example, assume the following:
  The cardinality of a column in a database table is 1024.
  There are 1,000,000,000 rows in the database table.
  The column value in each row is dictionary-encoded with 10 bits.
  Each value in the column is a value between zero and one minus the cardinality of the column, which in this case is 1023.
  A query has been received that includes one or more conditions based on the column
  The database server has evaluated the one or more conditions on the dictionary values and generated the following dictionary bit-vector: <0000 0000, . . . , 0001 0100, 0001 0001>. The bit-vector is the same width as the cardinality of the column: 1024 bits.
  Each SIMD register is 256 bits wide.

Loading Dictionary-Encoded, Fixed-Width, Bit-Packed Values (or Dictionary Indexes) in a Plurality of Subregisters in a Single SIMD Register Using One or More SIMD Operations In step 302, one or more dictionary-encoded column values are loaded in one or more subregisters of a SIMD register. For example, the database server may cause the SIMD processor to perform one or more operations discussed above, such as the operations discussed above in step 102 and/or steps 202 through 208 (load, shuffle, shift, and/or mask), which when executed cause a plurality of bit-packed, fixed-width values (< . . . , 00000 00000, 00000 00001, 00000 01010>) to load into subregisters in SIMD register 320. The width of each value is 10 bits because the cardinality is 1024. Register 320 in FIG. 3A illustrates the state of subregister 322, subregister 324, and subregister 326 after loading the values into each register:
  The first dictionary-encoded column value (ten) is loaded in subregister 322;
  The second dictionary-encoded column value (one) is loaded in subregister 324; and
  The third dictionary-encoded column value (zero) is loaded in subregister 326.

Determining a Byte-Offset and Bit-Offset of Each Corresponding Dictionary Index in the Dictionary Bit-Vector In step 304, each loaded value is divided by eight, and the quotient and remainder are stored. The quotient is the byte-offset of the corresponding byte in the dictionary bit-vector. The remainder is the bit-offset of the corresponding bit in the dictionary bit-vector. For example, the value in each subregister in SIMD register 320 is integer-divided by eight and stored in each respective subregister in SIMD register 330. The remainder of each value is stored in each respective subregister in SIMD register 340.

An integer-divide may be defined as the floor of a numerator divided by a denominator. There are many ways to perform an integer-divide by eight. An optimized method for dividing a value in a register by eight is shifting the bits in the register three places towards the low end. For example, <1111 1010> (250) shifted by three places to the low end, which in this case is to the right, is <0001 1111> (31). The value in each subregister in SIMD register 330 may be generated by:
  copying the value in each subregister in SIMD register 320 into each subregister in SIMD register 330, respectively and in parallel; and
  shifting the value in each subregister in SIMD register 330 by three bits to the right in parallel.

There are many ways to determine the remainder of a value integer-divided by eight. An optimized method for determining the remainder is masking off bits in a subregister higher than the lowest three bits. For example, masking the bits in <1111 1010> (250) that are higher than three low end bits, which in this case is to the left, is <0000 0010> (2). The value in each subregister in SIMD register 340 may be generated by:
  copying the value in each subregister in SIMD register 320 into each subregister in SIMD register 340, respectively and in parallel; and
  masking the bits that are higher than the three lowest end bits in each subregister in SIMD register 330 in parallel.

Loading Bits in the Dictionary Bit-Vector According to the Byte-Offset and Bit-Offset In step 306, bytes in the dictionary bit-vector that have bits that correspond to the dictionary indexes currently loaded are also loaded. For purposes of illustrating a clear example, assume that storage 350 includes the dictionary bit-vector. A byte from storage 350 is loaded into each subregister in SIMD register 360, according to the corresponding byte-offset stored in each subregister in SIMD register 330, respectively. There are many ways to load a byte from storage 350 using a byte-offset. An optimized method for SIMD architecture uses the Gather operation, which fetches bytes from a register and/or memory and stores the bytes in SIMD subregisters in parallel. Using the Gather operation, as illustrated in FIGS. 3A and 3B, an SIMD processor may:
  Fetch the second byte, <0001 0100>, based on the value stored in subregister 332 (one), which corresponds with subregister 362, from storage 350 and load the byte in subregister 332.
  Fetch the first byte, <0001 0001>, based on the value stored in subregister 334 (zero), which corresponds with subregister 364, from storage 350 and load the byte in subregister 334.
  Fetch the first byte, <0001 0001>, based on the value stored in subregister 336 (zero), which corresponds with subregister 366, from storage 350 and load the byte in subregister 336.

In step 308, the bit that corresponds to the dictionary indexes currently loaded are shifted to the lowest end bit. For example, the bits in each subregister in SIMD register 360 may be shifted using the Variable-Right-Shift operation discussed above. The Variable-Right-Shift operation may shift each subregister in SIMD register 360 by the value in each subregister in SIMD register 340, respectively and in parallel. Accordingly, the bits in subregister 362 are shifted two places to the right, because the value of subregister 342 is two; the bits in subregister 364 are shift one place to the right, because the value of subregister 344 is one; and, the bits in subregister 366 are not shifted, because the value of subregister 366 is zero.

Generating an Output Bit-Vector for each Column Value

In step 310, the bit that corresponds to the dictionary indexes currently loaded are copied to an output bit-vector in a register and/or memory. For example, the Move-Mask operation, discussed above, may be used to copy the lowest bit in each subregister in SIMD register 360 into storage 370.

Additionally or alternatively, a SIMD processor may use the "gatherb" instruction to gather collect the correct bits from the dictionary bit-vector based on the dictionary index values loaded in a SIMD register. For example, in response to receiving the gatherb operation, the SIMD processor collects each bit in the dictionary bit-vector loaded in storage 350 accordingly to the dictionary index loaded in each subregister in SIMD register 320. The SIMD processor may store each collected bit in storage 370. The gatherb operation is described in detail in U.S. Provisional Application No. 61/801,207, U.S. Non-Provisional application Ser. No. 14/023,064, U.S. Non-Provisional application Ser. No. 14/023,249, and U.S. Non-Provisional application Ser. No. 14/023,265, all of which are incorporated by reference herein.

In the example embodiments illustrated in FIG. 3A and FIG. 3B, and discussed above, the set-membership process, and/or each step of the process, is performed on eight dictionary-encoded column values in parallel. The process is repeated until the 1,000,000,000 column values are processed. The resulting output bit-vector is a bit-vector is 1,000,000,000 bits long.

Variations

Some of the embodiments illustrated above each subregister may be eight, or thirty-two bits wide. Other embodiments may include other widths, including, but in no way limited to four bits, eight bits, thirty-two bits, sixty-four bits.

In many examples, subregisters may be four bytes. However, subregisters may be larger or smaller than four bytes. Furthermore, a default width, an operand, and/or a completer may be used to define the width of the subregisters for a particular operation.

In some of the embodiments illustrated and discussed above, the least significant bits (the "lowest" bits) were illustrated on the right side of registers or memory, and no sign bit was used. However, the examples included above are not intended to be limiting. The instructions discussed above may be implemented on many various hardware configurations that are different than those illustrated. For example, in other embodiments, the lowest bits are on the left side of registers or memory. Additionally some bit-vectors, registers, and/or subregisters by include a sign bit.

While the methods described above may be focused on SIMD architecture, these methods may also be implemented scalar and/or other non-SIMD instructions. The methods may also be included as part of an application programming interface. Furthermore the methods may implemented as an intrinsic, which may be a function a compiler recognizes and replaces with a particular block of assembly or machine code. Further still, one or more instructions may be stored on one or more non-transitory computer-readable mediums, which when executed by one or more processors, may cause one or more of the methods described herein to be performed.

In many of the examples, a SIMD register comprises three subregisters. This is not intended to be limiting in any way. SIMD registers may comprise more or fewer subregisters, all of which may be varying widths.

In the above examples, each dictionary index value is a fixed-width value. However, in an embodiment, each dictionary may be a variable width value. A data vector may define the width of the each dictionary index value, and each dictionary index value may be loaded accordingly. For example, a dictionary-encoded column with a cardinality of 32 may use a maximum number of five bits or less to represent each value in the dictionary-encoded column For purposes of illustrating clear examples, many of the above example embodiments illustrate determining whether one or more dictionary values satisfy one or more queries and/or query conditions, and which rows of the one or more dictionary-encoded column values are in the set of dictionary values that satisfy the query. However, the methods and systems discussed herein may be used to more quickly determine whether one or more values in a first set of values are included in a second set of values using SIMD instructions.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
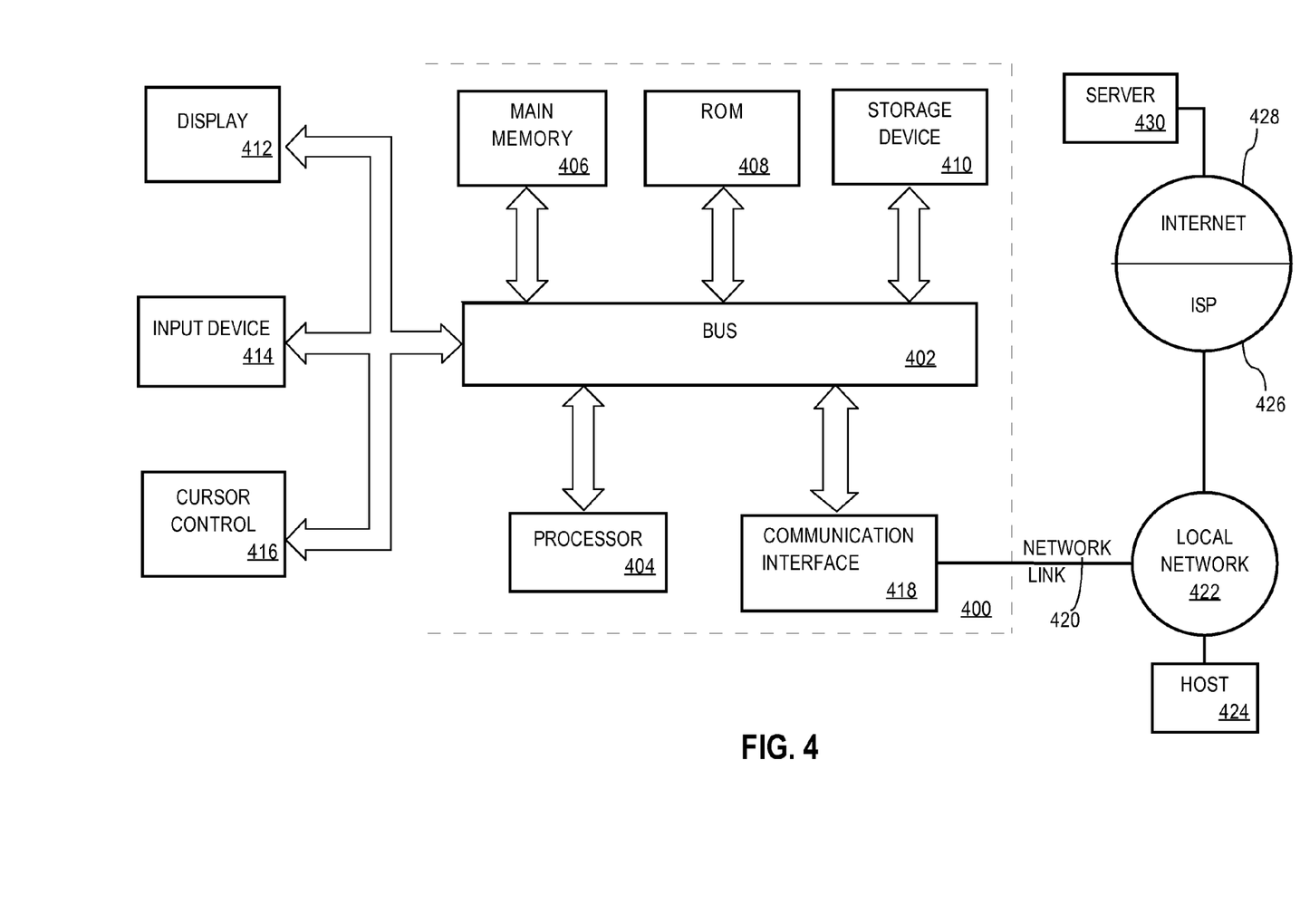
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  receiving a query that references a database table, wherein:
    the query has a predicate that specifies a search condition on a particular column of the database table;
    the particular column of the database table has been encoded based on a dictionary;
  copying a bit-vector into a first subregister and a second subregister, wherein the first subregister and the second subregister are subregisters in a single SIMD register;
  wherein the bit-vector that is copied into both the first subregister and the second subregister indicates which values, in the dictionary, satisfy the search condition;
  performing a shift operation that:
    shifts bits in the first subregister by a first value that corresponds with a first column value in a first row of the particular column in the database table, and
    shifts bits in the second subregister by a second value that corresponds with a second column value in a second row of the particular column in the database table;
    wherein the first value by which the bits in the first subregister are shifted is different than the second value by which the bits in the second subregister are shifted;
  after performing the shift operation:
    determining whether the first column value satisfies the search condition based on a resulting shifted first bit in the single SIMD register at a particular position in the first subregister;
    determining whether the second column value satisfies the search condition based on a resulting shifted second bit in the single SIMD register at the particular position in the second subregister; and
    providing results to the query based on whether the first column value satisfies the search condition and whether the second column value satisfies the search condition.

2. The method of claim 1 wherein:
  the database table comprises a plurality of rows, including the first row and the second row;
  each value in the particular column is an index into the dictionary; and
  each bit in the bit-vector corresponds to a unique value in the dictionary.

3. The method of claim 2 further comprising constructing the bit-vector by performing the following steps for each bit in the bit-vector:
  setting the bit to one if the unique value that corresponds to the bit satisfies the predicate; and
  setting the bit to zero if the unique value that corresponds to the bit does not satisfy the predicate.

4. The method of claim 1, wherein the single SIMD register is a first single SIMD register, and further comprising:
  copying the first value into a third subregister and the second value into a fourth subregister, wherein the third subregister and the fourth subregister are subregisters in a second single SIMD register;
  multiplying each value in the third subregister and the fourth subregister by a first power of two and a second power of two, respectively; and
  shifting bits in the third subregister and the fourth subregister such that the first value is aligned with the third subregister and the second value is aligned with the fourth subregister.

5. The method of claim 1, wherein the single SIMD register is a first single SIMD register, and further comprising:
  copying the first value into a third subregister and the second value into a fourth subregister, wherein the third subregister and the fourth subregister are subregisters in a second single SIMD register;

shifting bits in the third subregister such that bits representing the first value are aligned with the third subregister; and
shifting bits in the fourth subregister such that bits representing the second value are aligned with the fourth subregister; and
setting bits that do not represent the first value in the third subregister to zero; and
setting bits that do not represent the second value in the fourth subregister to zero.

6. The method of claim 1 comprising:
setting a first output bit in an output bit-vector to the first bit in the single SIMD register at the particular position in the first subregister, wherein each bit in the output bit-vector corresponds to a row in the database table and the first output bit corresponds with the first row in the database table; and
setting a second output bit in the output bit-vector to the second bit in the single SIMD register at the particular position in the second subregister, wherein the second output bit corresponds with the second row in the database table;
wherein determining whether the first row satisfies the search condition based on the first output bit; and
wherein determining whether the second row satisfies the search condition based on the second output bit.

7. A non-transitory computer-readable medium storing one or more instructions which, when executed by one or more processors, cause the one or more processors to perform steps comprising:
receiving a query that references a database table, wherein:
the query has a predicate that specifies a search condition on a particular column of the database table;
the particular column of the database table has been encoded based on a dictionary;
copying a bit-vector into a first subregister and a second subregister, wherein the first subregister and the second subregister are subregisters in a single SIMD register;
wherein the bit-vector that is copied into both the first subregister and the second subregister indicates which values, in the dictionary, satisfy the search condition;
performing a shift operation that:
shifts bits in the first subregister by a first value that corresponds with a first column value in a first row of the particular column in the database table, and
shifts bits in the second subregister by a second value that corresponds with a second column value in a second row of the particular column in the database table;
wherein the first value by which the bits in the first subregister are shifted is different than the second value by which the bits in the second subregister are shifted;
after performing the shift operation:
determining whether the first column value satisfies the search condition based on a resulting shifted first bit in the single SIMD register at a particular position in the first subregister;
determining whether the second column value satisfies the search condition based on a resulting shifted second bit in the single SIMD register at the particular position in the second subregister; and
providing results to the query based on whether the first column value satisfies the search condition and whether the second column value satisfies the search condition.

8. The non-transitory computer-readable medium of claim 7, wherein:
the database table comprises a plurality of rows, including the first row and the second row;
each value in the particular column is an index into the dictionary; and
each bit in the bit-vector corresponds to a unique value in the dictionary.

9. The non-transitory computer-readable medium of claim 8, further comprising instructions for constructing the bit-vector by performing the following steps for each bit in the bit-vector:
setting the bit to one if the unique value that corresponds to the bit satisfies the predicate; and
setting the bit to zero if the unique value that corresponds to the bit does not satisfy the predicate.

10. The non-transitory computer-readable medium of claim 7, wherein the single SIMD register is a first single SIMD register, and further comprising instructions for:
copying the first value into a third subregister and the second value into a fourth subregister, wherein the third subregister and the fourth subregister are subregisters in a second single SIMD register;
multiplying each value in the third subregister and the fourth subregister by a first power of two and a second power of two, respectively; and
shifting bits in the third subregister and the fourth subregister such that the first value is aligned with the third subregister and the second value is aligned with the fourth subregister.

11. The non-transitory computer-readable medium of claim 7, wherein the single SIMD register is a first single SIMD register, and further comprising instructions for:
copying the first value into a third subregister and the second value into a fourth subregister, wherein the third subregister and the fourth subregister are subregisters in a second single SIMD register;
shifting bits in the third subregister such that bits representing the first value are aligned with the third subregister; and
shifting bits in the fourth subregister such that bits representing the second value are aligned with the fourth subregister; and
setting bits that do not represent the first value in the third subregister to zero; and
setting bits that do not represent the second value in the fourth subregister to zero.

12. The non-transitory computer-readable medium of claim 7, comprising instructions for:
setting a first output bit in an output bit-vector to the first bit in the single SIMD register at the particular position in the first subregister, wherein each bit in the output bit-vector corresponds to a row in the database table and the first output bit corresponds with the first row in the database table; and
setting a second output bit in the output bit-vector to the second bit in the single SIMD register at the particular position in the second subregister, wherein the second output bit corresponds with the second row in the database table;
wherein determining whether the first row satisfies the search condition based on the first output bit; and
wherein determining whether the second row satisfies the search condition based on the second output bit.

13. A hardware processor configured to:
receive a query that references a database table, wherein:
the query has a predicate that specifies a search condition on a particular column of the database table;
the particular column of the database table has been encoded based on a dictionary;
copy a bit-vector into a first subregister and a second subregister, wherein the first subregister and the second subregister are subregisters in a single SIMD register;
wherein the bit-vector that is copied into both the first subregister and the second subregister indicates which values, in the dictionary, satisfy the search condition;
perform a shift operation that:
shifts bits in the first subregister by a first value that corresponds with a first column value in a first row of the particular column in the database table, and
shifts bits in the second subregister by a second value that corresponds with a second column value in a second row of the particular column in the database table;
wherein the first value by which the bits in the first subregister are shifted is different than the second value by which the bits in the second subregister are shifted;
after performing the shift operation:
determine whether the first column value satisfies the search condition based on a resulting shifted first bit in the single SIMD register at a particular position in the first subregister;
determine whether the second column value satisfies the search condition based on a resulting shifted second bit in the single SIMD register at the particular position in the second subregister; and
providing results to the query based on whether the first column value satisfies the search condition and whether the second column value satisfies the search condition.

14. The hardware processor of claim 13 wherein:
the database table comprises a plurality of rows, including the first row and the second row;
each value in the particular column is an index into the dictionary; and
each bit in the bit-vector corresponds to a unique value in the dictionary.

15. The hardware processor of claim 14 further configured to construct the bit-vector by performing the following steps for each bit in the bit-vector:
setting the bit to one if the unique value that corresponds to the bit satisfies the predicate; and
setting the bit to zero if the unique value that corresponds to the bit does not satisfy the predicate.

16. The hardware processor of claim 13, wherein the single SIMD register is a first single SIMD register, and the processor is further configured to:
copy the first value into a third subregister and the second value into a fourth subregister, wherein the third subregister and the fourth subregister are subregisters in a second single SIMD register;
multiply each value in the third subregister and the fourth subregister by a first power of two and a second power of two, respectively; and
shift bits in the third subregister and the fourth subregister such that the first value is aligned with the third subregister and the second value is aligned with the fourth subregister.

17. The hardware processor of claim 13, wherein the single SIMD register is a first single SIMD register, and the processor further is configured to:
copy the first value into a third subregister and the second value into a fourth subregister, wherein the third subregister and the fourth subregister are subregisters in a second single SIMD register;
shift bits in the third subregister such that bits representing the first value are aligned with the third subregister; and
shift bits in the fourth subregister such that bits representing the second value are aligned with the fourth subregister; and
set bits that do not represent the first value in the third subregister to zero; and
set bits that do not represent the second value in the fourth subregister to zero.

18. The hardware processor of claim 13 further configured to:
set a first output bit in an output bit-vector to the first bit in the single SIMD register at the particular position in the first subregister, wherein each bit in the output bit-vector corresponds to a row in the database table and the first output bit corresponds with the first row in the database table; and
set a second output bit in the output bit-vector to the second bit in the single SIMD register at the particular position in the second subregister, wherein the second output bit corresponds with the second row in the database table;
wherein determining whether the first row satisfies the search condition based on the first output bit; and
wherein determining whether the second row satisfies the search condition based on the second output bit.

* * * * *

UNITED STATES PATENT AND TRADEMARK OFFICE
CERTIFICATE OF CORRECTION

PATENT NO. : 9,886,459 B2
APPLICATION NO. : 14/338219
DATED : February 6, 2018
INVENTOR(S) : Chavan et al.

Page 1 of 1

It is certified that error appears in the above-identified patent and that said Letters Patent is hereby corrected as shown below:

On the Title Page

On page 3, Column 1, item (56) under Other Publications, Line 23, delete "Tighly-Coupled" and insert -- Tightly-Coupled --, therefor.

On page 3, Column 1, item (56) under Other Publications, Line 24, delete "Reconfigureable" and insert -- Reconfigurable --, therefor.

On page 3, Column 1, item (56) under Other Publications, Line 37, delete "monedb," and insert -- monetdb, --, therefor.

On page 3, Column 2, item (56) under Other Publications, Line 10, delete "Upacking" and insert -- Unpacking --, therefor.

On page 3, Column 2, item (56) under Other Publications, Line 40, delete "harshtable" and insert -- hashtable --, therefor.

On page 3, Column 2, item (56) under Other Publications, Line 46, delete "Appollo" and insert -- Apollo --, therefor.

In the Specification

In Column 8, Line 36, after "column" insert -- . --.

In Column 12, Line 28, after "column" insert -- . --.

In Column 15, Line 21, after "column" insert -- . --.

Signed and Sealed this
Fourteenth Day of August, 2018

Andrei Iancu
*Director of the United States Patent and Trademark Office*